June 3, 1958  W. H. PUCK  2,836,883
DEVICE FOR REMOVING PARTS FROM A TRACTOR
Filed Sept. 24, 1956
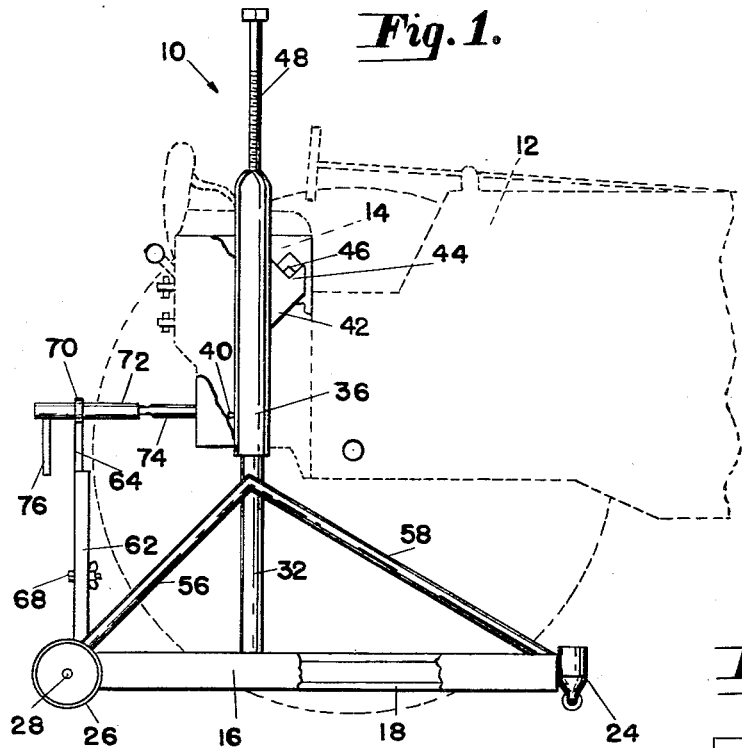
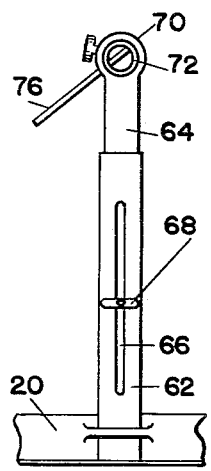
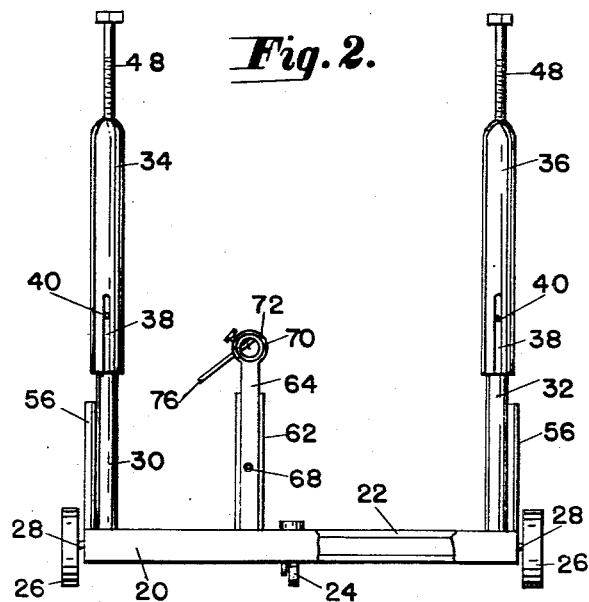
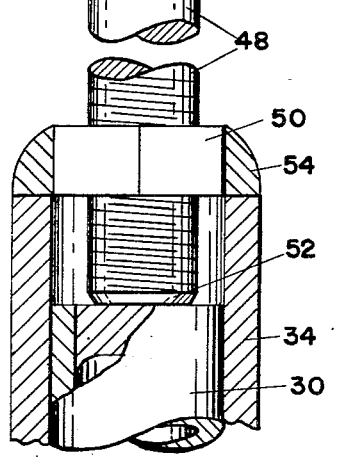
INVENTOR.
Willis H. Puck
BY Arthur H. Sturges.
Attorney United States Patent Office 2,836,883
Patented June 3, 1958

2,836,883

DEVICE FOR REMOVING PARTS FROM A TRACTOR

Willis H. Puck, Manning, Iowa

Application September 24, 1956, Serial No. 611,531

2 Claims. (Cl. 29—288)

The instant invention relates to tractors, and more particularly to a device to assist in the removal of the power lift mechanism of tractors, especially John Deere tractors.

The primary object of the instant invention is to provide a device to assist in the removal of a power lift unit from the rear of a tractor or the like.

Another important object of the invention is to provide a device which is adapted to be positioned adjacent the rear portion of a tractor or the like, and adapted to be attached to certain lift arms of the power lift mechanism, for supporting the weight of that mechanism during its removal.

A further object of the invention is to provide a device of simple and economical construction which will assist in the removal of a power lift mechanism from the rear of a tractor, so that one man may perform an operation which normally requires the combined efforts of several men.

Another important object of this invention is to provide an easily maneuverable mobile base from which vertically adjustable supports upstand, the supports having means on their upper ends to securely and safely receive and hold the lift arms and shaft elements of a power lift mechanism so as to support and hold the mechanism in detachment from a tractor.

Other and further objects and advantages of the invention will be understood from the following detailed description thereof.

In the drawings:

Figure 1 is a side elevation of the instant device in its attached position to the power lift mechanism of a tractor, prior to its removal.

Figure 2 is a rear elevation of the instant invention.

Figure 3 is an enlarged view of a spline retaining sleeve employed.

Figure 4 is an enlarged view of the adjusting mechanism for certain support members employed.

As has heretofore been the practice in dismantling of the power take-off and lift mechanism of a tractor, the bolts holding the mechanism to the tractor were loosened or removed, and the services of several men, using chain hoists or the like, had to be employed to remove the mechanism from the rear of the tractor. In circumstances where hoists were not available, it has heretofore been very hard to remove the said mechanism from a tractor.

The instant device obviates the difficulties of the prior practice by providing a simple and inexpensive device whereby one mechanic may easily remove the mechanism and reassemble the said mechanism in a simple and economical manner, thereby resulting in considerably less labor and expense than has heretofore been the case.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout and in which the numeral 10 refers to the invention in its entirety, and 12 indicates a tractor having as a part thereof a power take-off and lift mechanism 14 which is mounted on the rear of the tractor.

The instant device includes an oblong mobile base, preferably formed from angle iron members, having side bars 16 and 18, and end bars 20 and 22, the angle iron members being rigidly joined at their corners as by welding or the like.

At the forward end of the base, a caster-type wheel 24 is provided, and is centrally mounted to the forward end 22 of the base. At the opposite corners of the rear end 20 of the base, large disc wheels 26 are mounted on stub axles 28, whereby a great deal of maneuverability is obtained.

Secured to the side frames 16 and 18, as by welding or the like, are tubular upright support members 30 and 32, the upright support members 30 and 32 having the top portions thereof enclosed, as shown in Figure 4 of the drawings, by being capped with a thrust bearing.

Tubular support members or sleeves 34 and 36 are telescoped on the upright support members 30 and 32 and are slidable thereon. The members 34 and 36 are provided at their lower rear portions with slots 38, adapted to receive projections 40 which are secured to the upright members 30 and 32. In this manner the members 34 and 36 are held against rotational movement relative to the front end of the device so that the forward portion of the members 34 and 36, which has welded or otherwise secured thereto a rock shaft arm support 42 which is in a forward position at all times during use.

The rock shaft arm support 42, of which there are two in number, one on each of the upright members 34 and 36, has an upper V-shaped end 44, for the reception of the rock shaft arms 46 of the lift mechanism of the tractor.

The tubular members 34 and 36 are adapted to be adjusted in a vertical direction on the supports 30 and 32, in order to adjust to different heights and sizes of tractors. The vertical adjusting means includes an elongated bolt 48, adapted to be threaded through a nut or cap 50, having threads complemental to the threads on the bolt 48, with the end 52 of the bolt 48 bearing on the thrust bearing on top of the members 30 and 32. As the bolt 48 is turned into the nut or cap 50, the end 52 of the bolt 48 will bear on the thrust cap bearing of the members 30 and 32, and as the bolt turns the members 34 and 36 will rise. In this manner a fine adjustment can be made. Also, since the moveable element of the raising or elevating mechanism is a screw, an extremely heavy load may be accommodated with but little effort.

Referring to Figure 4, the nut is preferably positioned within the top of the tubular members 34 and 36 and is received therein, as at 54 in Figure 4.

The upright support structure is braced to the base by means of brace rods 56 and 58 which extend from the supports 32 to the forward and rear corners of the base, as shown in the drawings.

A power take-off shaft supporting means forms a part of the present device, and is positioned at the rear of the base frame and extends upwardly therefrom. It includes an upright channel or tubular member 62, having a bar or rod 64 slidably mounted therein. The member 62 is provided with an elongated aperture 66, to receive therethrough a wing nut or the like 68, so that the height of the spline support 60 may be regulated.

The upper end of the member 64 is provided with an eye 70, through which a sleeve 72 is positioned, the sleeve 72 being adapted to receive therein the splined power shaft 74 of the lift mechanism which shaft connects to the power take-off mechanism of the tractor. The other end of the sleeve 72 is provided with a handle 76, for rotating the splined shaft 74, and repositioning the mechanism back on the tractor. It will be understood that the forward end of the tubular member 72 is provided with splines complemental to the splines of the power take-off shaft 74.

Operation

When it is desired to remove the power take-off and power lift mechanism 14 from the rear of the tractor 12, the instant device 10 is located in a position relative to the tractor as shown in Figure 1 of the drawings. The rock shaft arm supports are positioned under the rock shaft arms, as shown. The members 34 and 36 are elevated so that the supports are firmly engaged with the rock shaft arms, whereupon the bolts holding the power take-off and power lift mechanism may be loosened and removed. Prior to the time the bolts are removed, the member 72 is positioned over the splined shaft 74 so that when the bolts are removed the power take-off mechanism will remain substantially in the same position, removed from the tractor, as it was when positioned on the tractor, and at this time all the necessary bolts are removed and the instant device is moved rearwardly, pulling the power take-off section away from the tractor for easy access and repairing the same. After repairs have been made, the instant invention is moved forward to again assume the position shown, in Figure 1 of the drawings. Then the handle 76 is used to cause the splined shaft 74 to engage with its coupling on the tractor, and the bolts holding the power mechanism returned to their proper places. This is easily accomplished since the position of the power take-off mechanism has remained unchanged with respect to its position on the tractor during repair operations, and all that is necessary is repositioning of the mechanism as shown in Figure 1. Thus, the task may be economically and easily accomplished by one man.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore a more lengthy description is regarded as unnecessary.

Changes in shape, size and arrangement of details and parts such as come within the purview of the invention claimed may be resorted to in actual practice, if desired.

What is claimed is:

1. In a support, the combination which comprises a base including side and end bars, a supporting caster mounted on one of the end bars and positioned midway of the length thereof, wheels mounted at the ends of the end bar at the end of the base opposite to that on which the caster is positioned, tubular upright support members mounted on the side bars and spaced from the end of the base on which the wheels are positioned, the upper ends of the upright support members being closed, sleeves having threaded openings in upper ends thereof slidably mounted over the upright support members, bolts having flat sides on upper ends thereof threaded in the threaded openings in the upper ends of the sleeves and positioned to engage the closed upper ends of the upright support members whereby rotation of the bolts adjusts the positions of the sleeves vertically, means for preventing turning of the sleeves on the upright support members, braces for retaining the upright support members in vertical positions, an upright channel mounted on the intermediate part of the end bar at the ends of which the wheels are positioned, a rod adjustably mounted on the channel, and a sleeve having a handle on one end and splines for receiving an end of a power take-off shaft of a tractor in the opposite end rotatably mounted on the upper end of the rod, the sleeves slidably mounted on the upright support members having rock shaft arm supports with aligned V-shaped upper ends extended from intermediate parts thereof.

2. In a support for the power lift mechanism of a tractor, the combination which comprises a base including side and end bars, a supporting caster mounted on one of the end bars and positioned midway of the length thereof, wheels mounted on the end of the base opposite to that on which the caster is positioned, upright support members mounted on the side bars and spaced from the end of the base on which the wheels are positioned, the upright support members having closed upper ends, sleeves having threaded openings in upper ends thereof slidably mounted over the upright support members, the sleeves having rock shaft arm supports with aligned V-shaped upper ends extended from intermediate parts thereof and also having vertically disposed slots in lower portions thereof, projections on the upright support members extended into the slots of the sleeves for preventing turning of the sleeves on the upright support members, bolts having heads with flat sides threaded in the upper ends of the sleeves and positioned with lower ends thereof in engagement with the closed upper ends of the upright support members whereby elevation of the rock shaft arm supports is adjusted by the bolts, brace rods for retaining the upright support members in vertical positions, an upright channel mounted on the intermediate part of the end bar in the end of the base on which the wheels are positioned; said channel having a vertically disposed slot therein, a rod vertically slidable in the channel and having retaining means extended through the slot therein, and a sleeve having a handle on one end and splines in the opposite end for receiving a power take-off shaft rotatably mounted in the upper end of the rod on the channel.

References Cited in the file of this patent

UNITED STATES PATENTS

| | | |
|---|---|---|
| 587,463 | Sullivan | Aug. 3, 1897 |
| 1,463,882 | Fuller | Aug. 7, 1923 |
| 1,515,915 | Valenta | Nov. 18, 1924 |
| 2,329,613 | Hokanson et al. | Sept. 14, 1943 |
| 2,504,201 | Johnson | Apr. 18, 1950 |